3,336,811
ANTIFRICTION SUPPORT MECHANISM FOR
GYROSCOPES
Martin S. Klemes, East Meadow, and Thomas R. Quermann, Huntington Station, N.Y., assignors to Sperry Rand Corporation, Great Neck, N.Y., a corporation of Delaware
Filed May 6, 1964, Ser. No. 365,405
6 Claims. (Cl. 74—5)

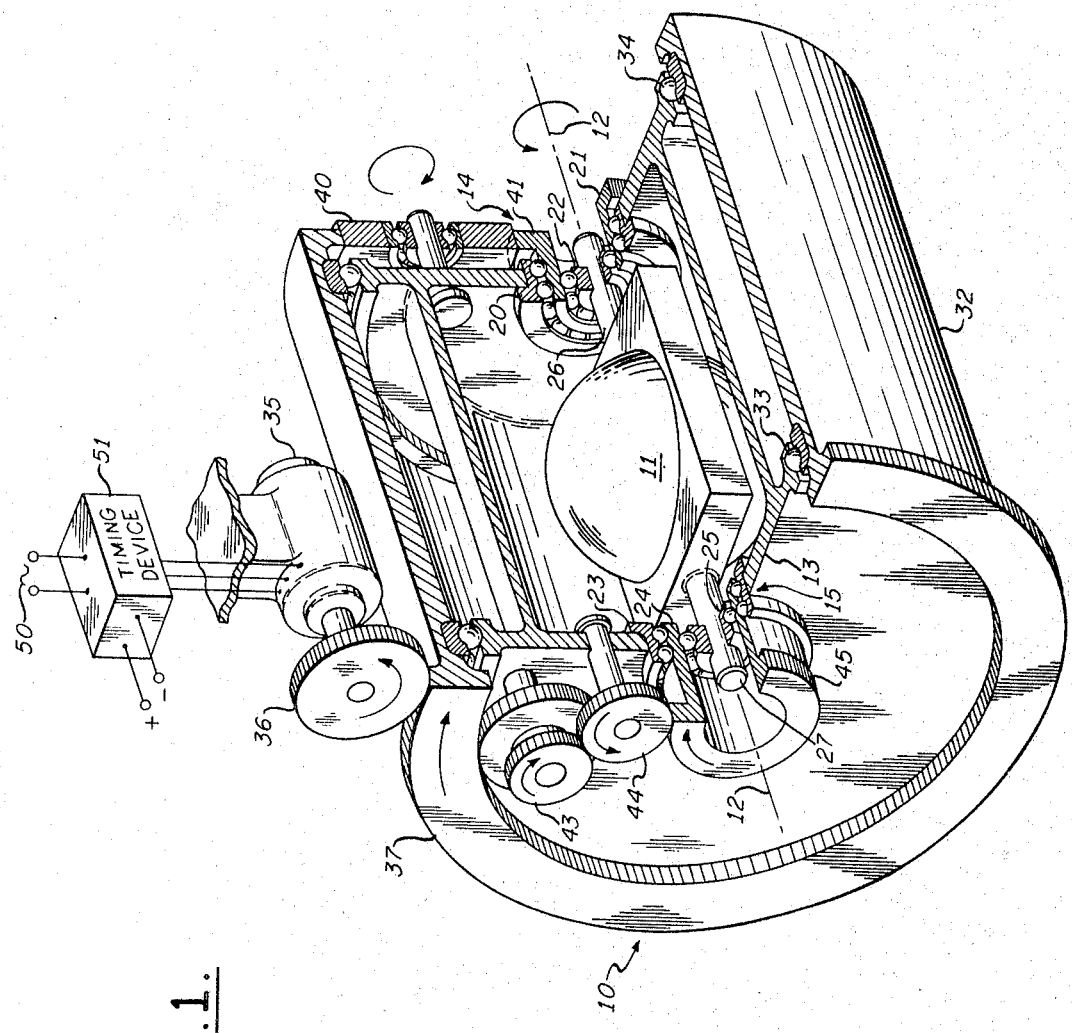

The present invention relates to antifriction support mechanisms for the sensitive elements of gyroscopes and like devices and particularly relates to means for minimizing periodic variation in drift of the gyroscopic spin axis.

In extremely high accuracy devices, particularly gyroscopic apparatus, there is an increasing need for higher accuracy support mechanisms, particularly those of the ball bearing type. In United States Patent 2,970,480, assigned to the assignee of the present invention, there is described a method for minimizing drift in gyroscopic devices by rotating the intermediate races of each of the two diametrically opposed compound bearings of the support mechanism in opposite directions and reversing the direction of rotation of each of said intermediate races periodically and simultaneously after a predetermined number of revolutions. The present invention is an improvement over the invention described in said U.S. Patent 2,970,480.

The present invention is a method for further improving the accuracy of gyroscopic devices by significantly reducing periodic drift variation caused by interaction of the ball to ball disturbances of each of the bearings supporting the sensitive element of the gyroscope. The magnitude and direction of this drift variation depends upon the phase relationship existing between these disturbances. So long as the phase relationship between these disturbances does not change, the net torque pattern acting on the gyroscope remains constant. Slight geometric differences, load variations, temperature gradients, etc. between the two supporting bearings will, however, cause the ball complements of the bearings to rotate at slightly different speeds. This changes the phase relationship between the disturbances and thus the net torque pattern acting on the gyroscope changes. A characteristic beat frequency drift results which is dependent upon the rotational speed of the driven races. In accordance with the teachings of the present invention, a significant reduction in drift variation is accomplished, in the preferred embodiment of the invention, by rotating the driven races of each of the two supporting bearings at different speeds whereby producing a modulation of the net ball to ball torque pattern at a sufficiently high frequency to permit effective filtering, and reversing the direction of rotation of each of said driven races simultaneously after an integral number of driven race runout modulation periods.

It is a primary object of the present invention to provide an improved antifriction support mechanism for the sensitive elements of gyroscope instruments.

It is an additional object of this invention to provide a method for substantially eliminating periodic variation in drift of a gyroscopic spin axis.

Other objects of the invention will become apparent from the following description and the drawings.

FIG. 1 is a perspective view partly in section of a single degree of freedom gyroscope embodying the teachings of the present invention.

Figure 2A:
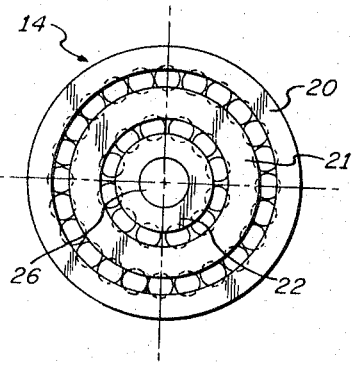
FIGURES 2a and 2b are plan views of one of the compound bearings of the support mechanism of FIG. 1 and illustrates the ball to ball disturbances causing the periodic variation in drift which is substantially eliminated by the present invention

Referring to FIG. 1, the gyroscope 10 comprises a sensitive element 11 within which a hermetically sealed gyro rotor, not shown, spins at a very high angular velocity. The sensitive element 11 is rotatably mounted about its output axis 12 on a frame 13 by means of spaced compound bearings 14 and 15. Compound bearing 14 comprises an outer race 20, an intermediate race 21 and an inner race 22. Compound bearing 15 similarly comprises an outer race 23, an intermediate race 24 and an inner race 25. The compound bearings 14 and 15 are mounted on diametrically opposed sides of the sensitive element 11 and cooperate with trunnions 26 and 27 thereof respectively. For reasons fully explained in the aforementioned U.S. Patent 2,970,480, a substantial reduction in drift is realized if the intermediate races 21 and 24 of the bearings 14 and 15 respectively are rotated in opposite directions with respect to each other for at least one complete revolution and their respective directions of rotation periodically and simultaneously reversed.

In the embodiment of FIG. 1, rotation of the intermediate races of the supporting bearings in directions opposite to each other and with a speed differential between the rotational speed of the respective intermediate races is accomplished as follows A rotatable hollow cylinder 32 is disposed about the sensitive element 11, the axis of symmetry of the cylinder 32 being coaxial with the axis 12 of the sensitive element 11. Spaced bearings 33 and 34 support the cylinder 32 on the frame 13 for rotation about the axis 12. Motor 35 drives the cylinder 32 by means of driving gear 36 which directly connects with the gear teeth of a ring gear 37. Said ring gear 37 is integral with cylinder 32, and like cylinder 32, it has its axis of rotation coaxial with the axis 12 of the sensitive element 11. The rotation of the cylinder 32 is transmitted to intermediate race 21 by means of an intermediate gear 40 mounted for rotation on frame 13. Intermediate gear 40 meshes with ring gear 41 which is integral with intermediate race 21. Intermediate race 21 of bearing 14 is thus rotated, for example, in a counterclockwise direction as indicated by the arrow at a speed determined by the speed of the motor 35, and the configuration of the gear train comprising driving gear 36, ring gear 37, intermediate gear 40 and ring gear 41. The rotation of the cylinder 32 is also transmitted to the intermediate race 24 by means of intermediate gears 43 and 44, said intermediate gears 43 and 44 being mounted for rotation on frame 13, and ring gear 45 which is integral with intermediate race 24. The configuration of the gear train comprising intermediate gears 43 and 44 is chosen so that the rotation of cylinder 32 drives the intermediate race 24 of bearing 15 at a speed different from that of intermediate race 21 of bearing 14 and in a direction opposite to that of said intermediate race 21. Preferably this speed differential should be as high as possible but low enough so as not to mismatch the drag torques of the respective bearings. In order to reverse the direction of rotation of cylinder 32 and thus the direction of rotation of intermediate races 21 and 24, the motor 34 is connected to a timing device 51 to a source of power 50. The timing device may be, for example, a multivibrator that periodically reverses the polarity of the electrical potential applied to motor 35.

Figure 2B:
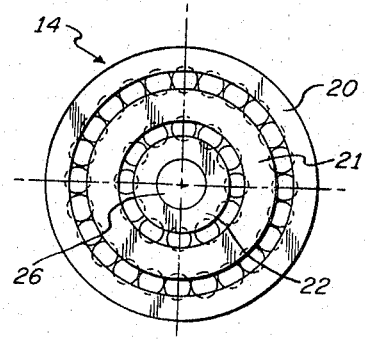
Figure 2C:
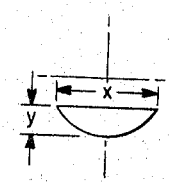
FIGURE 2c illustrates the vertical and horizontal movement of any given ball during rotation.

Referring now to FIGS. 2a and 2b, compound bearing 14, as explained above, comprises an outer race 20, an intermediate race 21 and an inner race 22, said inner race 22 is fixedly mounted on trunnion 26. Due to radial looseness in bearing 14 and the finite number of load carrying balls between inner race 22 and intermediate race 21, the center line of inner race 22 moves up and down through a distance $y$ and translates through a distance $x$ as each successive ball passes under the line of action of the applied radial load. The locus of the center line of inner race 22 is shown in FIG. 2c. This phenomenon, known as "ball action," is present in even the best available ball bearings. A similar motion of the center line of inner race 25 of compound bearing 15 also takes place. The net effect of these two motions is an angular oscillation of the output axis 12 of the sensitive element 11. So long as the phase relationship between the disturbances causing the motions of the center lines of the respective inner races does not change the net torque acting on the gyroscope remains constant. Because of manufacturing tolerance variations in the ball and race diameters of compound bearings 14 and 15, load variations between the respective supporting bearings etc., the ball complements of the bearings will rotate at slightly different speeds causing the phase relationship between the aforesaid motions of the center lines of the inner races of each bearing to change, thereby changing the net torque acting on the gyrosrope and resulting in a periodic variation in drift of the spin axis of the gyroscope. This drift variation, however, may be substantially eliminated by the rapid averaging of the disturbing torques. A periodic motion is also imparted to the center lines of the inner races of the respective bearings because of eccentricities in the driven races. The differential speed drive described above averages the disturbing torques which occur at driven race frequency to zero if the period of reversal is synchronized to the differential drive frequency, i.e. if the reversal period is controlled to be a fixed multiple of the difference modulation periods. Thus, for example, if driven race 21 of compound bearing 14 is rotated at 60 r.p.m. and driven race 24 of compound bearing 15 is rotated at 48 r.p.m., there are 12 beats per minute and a modulation period of 5 seconds. The reversal period can be any fixed multiple of 5 second periods.

Figure 3A:
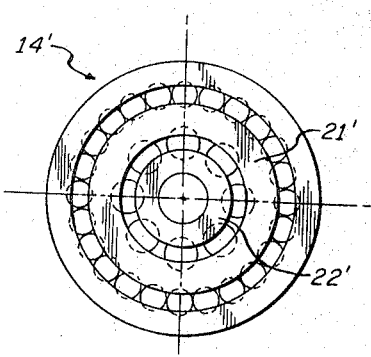
FIGURES 3a and 3b are plan views of each of the two compound bearings of the support mechanism incorporating another embodiment of the present invention.
Figure 3B:
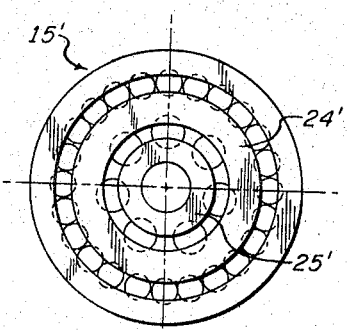

Referring now to FIGURES 3a and 3b, there is illustrated another embodiment of the present invention. In this embodiment the bearings of the support mechanism are deliberately mismatched by incorporating a different number of balls between the inner and intermediate races of the respective bearings. Since the "ball action" described above is directly related to the number of balls passing under the line of action of the applied radial load per unit of time, the modulation of the net torque acting on the gyroscope is directly introduced by the differential in the number of balls between the inner and intermediate races of the respective bearings. In this embodiment of the invention it is not necessary to drive the respective bearings at different speeds. The reversal period is still, however, chosen so that it is an integral number of modulation periods. For example, in the embodiment shown in FIGURES 3a and 3b, respectively there are eight balls between inner race 22' and intermediate race 21' of compound bearing 14' and seven balls between inner race 25' and intermediate race 24' of compound bearing 15'. If the rotational speed of the driven races 21' and 24' is, for example, 56 r.p.m., the ball to ball disturbances beat approximately every 2 seconds. The actual beat period will be effected by the particular ball and race diameters and by the load carried by the bearings. The reversal period is, therefore, chosen to be an integral number of these 2 second periods.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In combination, a sensitive element, first and second spaced antifriction means for rotatably supporting said sensitive element about an axis thereof, said first and second antifriction means each having a rotatable member, drive means for rotating said members in directions opposite to each other including means for modulating the net torque pattern introduced by said first and second antifriction means on said sensitive element, and means for periodically and simultaneously reversing the direction of rotation of said driven members upon completion of an integral number of modulation periods.

2. In combination, a sensitive element, first and second spaced antifriction means for supporting said sensitive element about an axis thereof, said first and second antifriction means each having a drivable member, means for driving said members in opposite directions and at different speeds thereby modulating, at the diffierential drive frequency, the net torque pattern introduced by said first and second antifriction means on said sensitive element, and means for periodically and simultaneously reversing the direction of rotation of said driven members upon completion of an integral number of modulation periods.

3. In combination, a sensitive element, first and second spaced bearing means for rotatably supporting said sensitive element about an axis thereof, said first and second bearing support means each having a drivable member, drive means for rotating said drivable members at different speeds and in directions opposite to each other, and means for simultaneously reversing the direction of rotation of said driven members periodically at intervals dependent upon the relative rotational speeds of said driven members.

4. In a gyroscopic device, the combination of a sensitive element, first and second spaced compound bearings mounted on opposite sides of said sensitive element for rotatably supporting said sensitive element about an axis thereof, said first and second spaced compound bearings each having an inner race, a drivable intermediate race and an outer race, drive means for rotating the intermediate race of said first bearing at one speed and the intermediate race of said second bearing at a different speed, and means for simultaneously reversing the direction of rotation of said intermediate races periodically at intervals dependent upon the relative rotational speeds of said intermediate races.

5. A method of minimizing variation in drift in gyroscopic apparatus including the steps of rotating an element of each of two spaced bearings supporting the sensitive element of said gyroscope at different speeds and in directions opposite to each other, and periodically and simultaneously reversing the direction of rotation of said elements at intervals dependent upon the relative speeds of said rotating elements.

6. In a gyroscopic device, the combination of a sensitive element, first and second spaced compound ball bearing means mounted on opposite sides of said sensitive element for rotatably supporting said sensitive element about an axis thereof, said first and second spaced compound ball bearing means each having an inner race, an intermediate race and an outer race, the ball complements between the inner and intermediate races of the respective bearings being different, drive means for rotating the intermediate races of said bearings in directions opposite to each other and means for periodically and simultaneously reversing the direction of rotation of said intermediate races.

References Cited

UNITED STATES PATENTS 3,082,629   3/1963   Jones et al. _____ 74—5.4

FRED C. MATTERN, JR., *Primary Examiner.*

BROUGHTON G. DURHAM, *Examiner.*

T. W. SHEAR, C. J. HUSAR, *Assistant Examiners.*